US006054090A

United States Patent [19]

Duis et al.

[11] Patent Number: 6,054,090

[45] Date of Patent: Apr. 25, 2000

[54] METHOD OF STEAM-STERILIZING CONTACT LENS LABEL

[75] Inventors: Donnie Jerome Duis; Daniel Tsu-Fang Wang; James Malcolm Peck, all of Jacksonville, Fla.

[73] Assignee: Johnson & Johnson Vision Products, Inc., Jackonsville, Fla.

[21] Appl. No.: 09/112,186

[22] Filed: Jul. 9, 1998

[51] Int. Cl.[7] .............................. B23K 26/00; B32B 3/00; B65B 55/12

[52] U.S. Cl. ............................ 264/400; 53/425; 264/482; 422/26; 428/200; 428/203; 428/209; 428/457; 428/461

[58] Field of Search ..................................... 264/400, 482; 428/200, 203, 423.1, 423.7, 424.2, 424.8, 457, 458, 461, 209; 53/425; 422/26

[56] References Cited

U.S. PATENT DOCUMENTS

| | | | |
|---|---|---|---|
| 5,061,341 | 10/1991 | Kildal et al. | 156/632 |
| 5,488,815 | 2/1996 | Abrams et al. | 53/425 |
| 5,653,844 | 8/1997 | Abrams | 156/277 |
| 5,656,362 | 8/1997 | Abrams | 428/200 |

FOREIGN PATENT DOCUMENTS

| | | |
|---|---|---|
| 62/203691 | 9/1987 | Japan . |

OTHER PUBLICATIONS

*Laser Focus*, Jul. 1975, p. 28 et seq.

*Primary Examiner*—Mathieu D. Vargot
*Attorney, Agent, or Firm*—Dana M. Schmidt; Anne B. Kiernan

[57] ABSTRACT

A process for steam-sterilizing label-bearing containers stacked with the labels in contact, without destroying the labels such as occurs if the labels are printed by thermal transfer for product-variable data. The process features laser-ablating imagewise the label to remove an ink layer so as to expose either a contrasting ink layer below, or a metal foil or polymer substrate. Such containers are then readily stacked on the labels and sterilized without thermal damage to the labels.

12 Claims, 2 Drawing Sheets

METHOD OF STEAM-STERILIZING CONTACT LENS LABEL

FIELD OF THE INVENTION

This invention relates to a process of producing a label on a contact lens container, the resulting label, and the subsequent steam-sterilizing thereof, such that the label is not destroyed by virtue of its contact with a heated, possibly moist surface.

BACKGROUND OF THE INVENTION

It is known to print labels for containers by reverse-printing unchanging indicia, such as brand names, on the underside of a polyester layer adhered to a metal foil, and then printing by thermal transfer, variable product-related data, such as lot numbers, onto the external surface of the polyester layer. See, for example, the methods and laminates described in U.S. Pat. No. 5,653,844 and U.S. Pat. No. 5,656,362. Such labels are particularly useful for containers of contact lenses, where the labels appear on the exposed top surface of the lid.

Although such techniques have proven very advantageous, there remains a possible area for improvement. That is, such labels, when used on containers of contact lenses, have to undergo a sterilization process. Most preferable is a steam sterilization process as described, for example, in U.S. Pat. No. 5,488,815. In that process, lens containers are paired together (at B, FIG. 1) with the thermal print surface facing outward, then pushed into a slot in a storage box 100 where one of the print surfaces rests on the inside surface of the slot. The box with all its slots and lens containers in the slots is steam-sterilized in a steam chamber 150. But because this can cause transfer of the thermal print indicia from the lens container to the box 100, the box first must be flipped 90° (step F of FIG. 1) so that the box slots are vertical and less contact occurs between the lens containers and the box slot surfaces containing them. Thereafter, the paired lens containers are removed from box 100 and packaged into a package 22 where they are stacked, each with the thermal print surface contacting the thermal print surface of the next adjacent container (FIG. 3).

One problem with such an approach is that even with the box slots (and contained lens containers) flipped to a vertical orientation, some contact can still occur between the thermal print surface and the slot surface during sterilization, leading to loss of label indicia. FDA regulations permit only a negligible occurrence of such failures. Furthermore, the process of the '815 patent goes to a lot of trouble to batch sterilize lens packages in a manner that minimizes, if not eliminates, contact of the thermal print surface of the lens package, with some other surface. Steam sterilization would be most efficient if practiced by steam-treating the package 22 with all of the plurality of stacked containers already in place, thus eliminating any intermediate storage box 100. Heretofore, steam-treating such a stack has not been possible, because of the transfer of thermally printed indicia to whatever the label contacts. (Hereinafter, "transfer surface" refers to a surface that is capable of having a thermally printed label transfer to it under heated conditions.)

Thus, there has been a need prior to this invention to provide a method which will allow steam-sterilization of contact lens containers while they are stacked, without destroying their labels.

SUMMARY OF THE INVENTION

We have discovered a method that meets the aforementioned need so as to facilitate steam sterilization. This method utilizes a novel method of forming the label of the contact lens container so as to render it permanent even under steam sterilization conditions.

More specifically, in accordance with one aspect of the invention, there is provided a method of preventing transfer of printed labels on stacked containers during steam-sterilization, comprising the steps of:

a) providing a label on an exposed surface of the container, the label comprising a first layer comprising a metal or a polymer, the first layer having a predetermined apparent color; a second layer affixed to the first layer and comprising a polymer, the second layer having two opposing surfaces, one of the surfaces being a proximal surface affixed to the first layer and the other of the surfaces being a distal surface spaced away from the first layer when affixed, one or both of the surfaces bearing a coating of ink or dye, an area of any ink or dye on the distal surface being selected from a color that is in contrast to the predetermined color and an area of any ink or dye on the proximal surface being of a color that is in contrast to the ink or dye on the distal surface or to the predetermined color of the first layer; a portion of the second layer being ablated away at said area of ink or dye by a laser in accordance with a label pattern in an amount sufficient to expose, in the ablated portions, either ink or dye on the proximal surface, or the first layer;

b) stacking at least some of the containers so that the label of at least one of the stacked containers contacts the surface of an adjacent container; and c) while maintaining the stack, subjecting the stack to steam at a temperature, pressure and exposure time sufficient to sterilize the stacked containers and their contents;

so that the label in contact with the next adjacent container does not transfer in whole or in part and remains legible.

In accordance with another aspect of the invention, there is provided, as a tool in achieving the first aspect, a method of forming a label for a cover of a container of contact lenses, comprising the steps of:

a) providing as a surface portion of the cover, a first layer comprising a metal or a polymer, the first layer having a predetermined apparent color;

b) affixing to the layer, a second layer comprising a polymer, said second layer having two opposing surfaces, one of the surfaces being a proximal surface affixed to the first layer and the other of the surfaces being a distal surface spaced away from the first layer when affixed, one or both of the surfaces bearing a coating of ink or dye, an area of any ink or dye on the distal surface being selected from a color that is in contrast to the predetermined color and an area of any ink or dye on the proximal surface being of a color that is in contrast to the ink or dye on the distal surface or to the predetermined color of the first layer; and c) ablating away in the area of any ink or dye, a portion of the second layer with a laser in accordance with a label pattern, in an amount sufficient to expose, in the ablated portions, either ink or dye on the proximal surface, or the first layer.

In accordance with yet another aspect of the invention, there is provided a label produced by the process of the preceding paragraph.

Accordingly, it is an advantageous feature of the invention that printed labels on containers can be steam-sterilized while the labels are in contact with a transfer surface, without destroying the label by transferring all or part of the label to that surface.

It is a related advantageous feature of the invention that such sterilization can be achieved by stacking the containers in a package without regard to orientation, and steam-treating the entire package.

Other advantageous features will become apparent upon reference to the following Detailed Description, when read in light of the attached drawings.

DESCRIPTION OF THE PREFERRED EMBODIMENTS

This invention is described in connection with certain preferred embodiments, wherein the labels undergoing steam sterilization are for contact lens packages, and are prepared by laser ablation through a polyester layer using preferred $CO_2$ lasers to provide product-variable indicia such as lot number and expiration date. In addition, the invention is useful for steam sterilization regardless of the contents of the containers so labeled or of the exact indicia of the label in question. The invention is also useful for laser-ablating through polymers in addition to polyester, to form such labels regardless of the type of laser utilized. (As is well-known, certain lasers are better suited for certain materials, ablation, than others.) This invention is also applicable whether the label is affixed after laser-ablation, or is part of the lid stock of a container at the time of ablation.

Thus, any label material can be laser-ablated and steam-sterilized by this invention. Preferred are those described in the aforesaid U.S. Pat. No. 5,656,362. Highly preferred are the materials shown herein in FIGS. 1 through 3.

Figure 1:
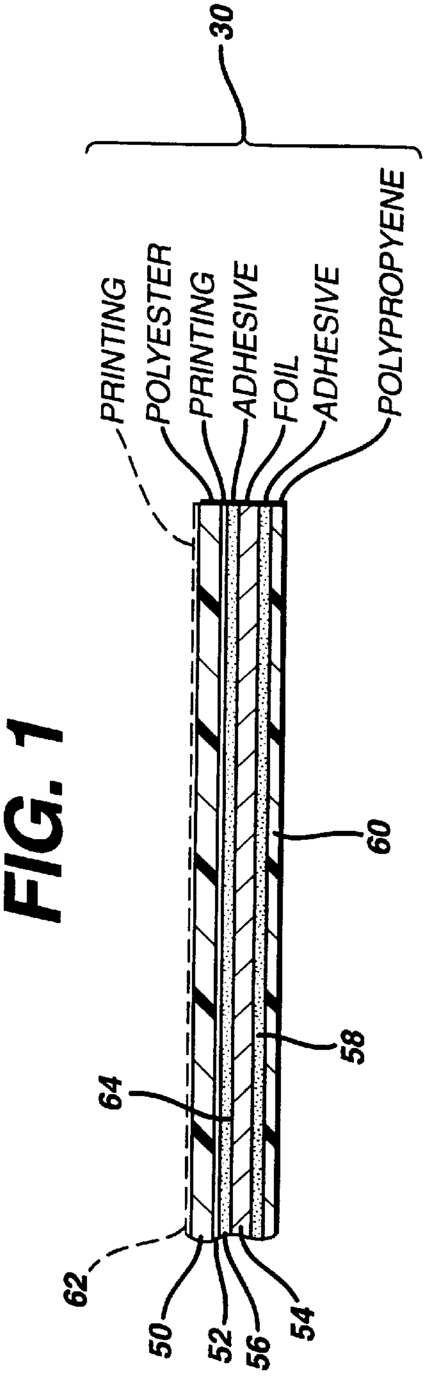
FIG. 1 is a fragmentary elevational view in section of a label, depicting laser ablation thereof in accordance with one aspect of the invention, also used as a first step in the steam-sterilization of the invention.
Figure 2:
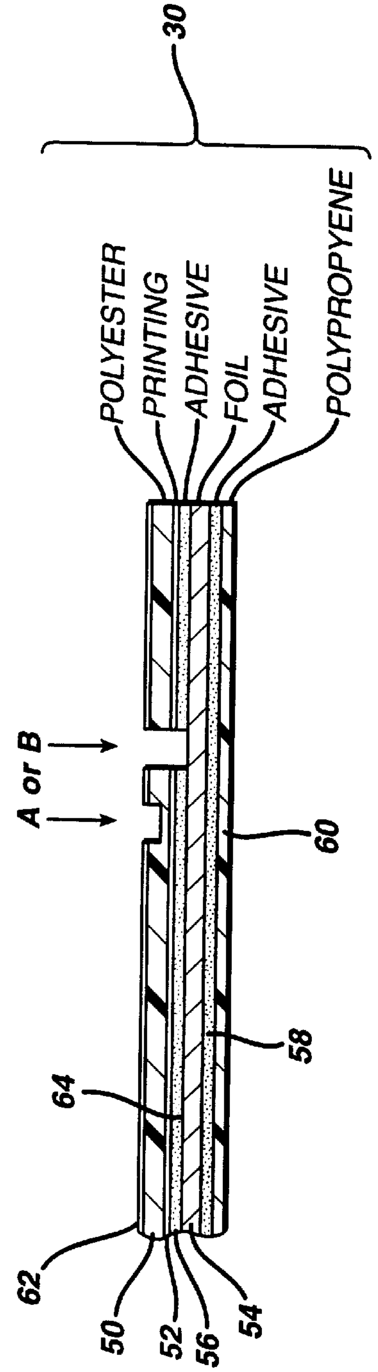
FIGS. 2 and 3 are fragmentary sectional views similar to FIG. 1 but illustrating alternative embodiments of the laser-ablation process.

Thus, label 30 in FIG. 1, preferably comprises a metal or polymer substrate 54, most preferably an aluminum foil, on which is laminated such as by adhesive layer 56, a polymer layer 50 having a layer 52 of printing ink or dye on the proximal surface of layer 50, i.e., the one closest to layer 54, and/or another layer 62 of printing ink or dye on the distal surface of layer 50, that is, the surface most removed from layer 54. If a polymer is used as layer 50, it is preferably selected from the group consisting of a polyamide such as "Nylon", a polyester, a polyolefin, a polystyrene, and a polycarbonate. The most preferred polymer for this use is a transparent or translucent polyester. The surface 64 of foil layer 54 has a particular predetermined color content, and the color of an area of a portion of layers 52 and 62 to be ablated, is selected with that in mind. More specifically, the color of layer 62, which is preferably an ink, is selected in said area, to contrast with the color of surface 64, wherein "contrast color" or "contrasting in color" means, a print contrast of at least 0.75, as determined by subtracting the reflectances of the contrasting colors as they are measured on a reflectometer such as the "PC Meter II"™ available from MacBeth, using the formula:

$$\text{print contrast} = \frac{(\text{light reflectance} - \text{dark reflectance})}{\text{light reflectance}}.$$

On the other hand, in that same area, the color of layer 52, which is also preferably an ink, is selected to be in contrast with the color of layer 62 or to the color of surface 64, depending on the printing embodiment selected (described hereinafter.) As will become apparent, layers 52 and 62 can be used alternatively, or together.

If layer 54 is a polymer, it is preferably a polyamide such as "Nylon", a polyimide, or a polyester. Various thicknesses are useful in such a case, such as 120 microns. The polymer may be translucent or transparent, or may be dyed or otherwise provided with an apparent color.

Layer 60 of a polypropylene, and its foil-attaching adhesive 58, are optional and can be included or not, as desired.

Apart from the above, all of the materials selected for layers 52, 54, 56, 58, 60, and 62 are conventional and require no further description. The corresponding materials and preparation thereof described in U.S. Pat. No. 5,653,844 and U.S. Pat. No. 5,656,362 are expressly incorporated herein by reference as examples, wherein layer 62 can be of a material identical to that of layer 52, albeit of either the same or a contrasting color.

In conventionally printed labels, layer 62 is preferably thermally printed in the form of variable label indicia, and it is this layer that can be destroyed when contacting a transfer surface during heating for sterilization (or any other purpose). Thus, the purpose of this invention is to provide a label that avoids forming layer 62 as a thermally printed layer.

In accordance with one aspect of the invention, layer 62 if used is a permanent ink, rather than a thermally transferred ink image. Additionally, FIG. 2, the process features laser-ablating away imagewise, enough of layer 62 and/or layer 52 to form a contrast between the remaining under-layers and the top or outermost colored layer. A portion of layer 62, if used, is preferably of a contrasting color to either layer 52 or layer 54. If layers 52 and 62 are both present and layer 62 contrasts in color with both layers 52 and 54, then a suitable laser beam can ablate away only the layer 62 and a portion of polyester 50 as shown at "A", or it can also ablate down as shown in "B" to expose foil layer 54 and its surface 64.

If layer 54 is a polymer, then preferably laser ablation as shown at "A", is used.

Alternatively, if layers 52 and 62 are similar in color, then preferably the imagewise-ablation shown at "B" is used. (Such a technique might be used, for example, if separate layers 52 and 62 are not sufficiently contrasting by themselves, but together do provide sufficient contrast.)

The laser ablation steps are conventional, preferably using a $CO_2$ laser. For example, the $CO_2$ laser manufactured under the Model No. H48-15W-5673 by Synrad Corporation, operating at 10.63 micrometers and 15 watts of rated power, is highly useful. Its preferred settings, when using a thickness of 12 micrometers for layer 50, and 50 micrometers for aluminum foil layer 54, is as follows:

| | |
|---|---|
| Focal Length: | 6.5 inches |
| Line Width: | 0.007–0.010 inches (width of the mark done by a single pass of the steered beam) |
| Working Distance: | 3.5 inches +/− 1/16 inch |
| Speed: | 60–100 laser pulses per minute or 20 inches per |

-continued

| | |
|---|---|
| | second (range is 0 to 90 inches per second) |
| Power Range: | 90–100% |
| Marking Field: | 4 inches square |
| Method of Steering | |
| Laser Beam: | Vector steering using special mirrors mounted to galvanometers that move the beam in order to "write" |
| Label 30: | Static. |

The level of power of the laser will of course cause the beam to only partially ablate layer 50, as in case "A", or to ablate down to foil 54, as in case "B".

As well-known, other settings are useful depending on the materials and thicknesses used for the layers of label 30.

Figure 3:
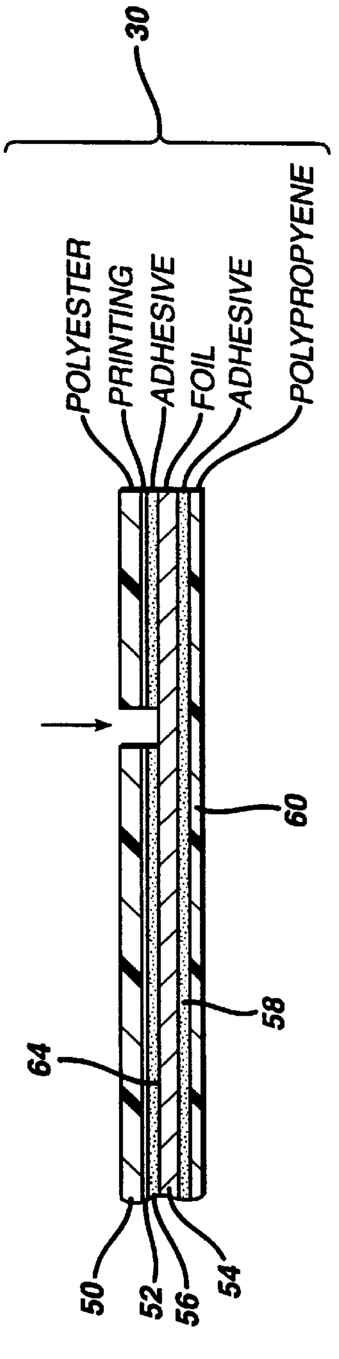

Alternatively, and preferably, FIG. 3, layer 62 can be omitted entirely. In this case, the laser imagewise ablates at "B" all the way down to expose surface 64 of foil lawyer 54, to reveal a color that contrasts with that of layer 52. Even variable indicia, such as lot numbers, can be formed in this manner.

Yet another option, not shown, is to eliminate ink/dye layer 52 and use only layer 62, in which case imagewise ablation also occurs all the way to surface 64.

The aforesaid label can be formed by the laser ablation either before or after the raw stock laminate is affixed to the container.

In accordance with another aspect of the invention, such a laser-ablated label renders it possible to do steam sterilization without regard to transfer damage to the label. That is, there is no thermally printed indicia capable of inadvertent thermal transfer off the label. Thus, FIG. 4, a plurality of containers 112, each shown containing a contact lens in a bubble, can be packaged in stacks in a package or box 122, with exposed image bearing label surfaces 130 in contact with each other or package 122. For example, label surfaces 130 can comprise imagewise-modified layer 62 of label 30, FIG. 2, or exposed, imagewise-modified layer 50 of FIG. 3. The entire package 122 and its contents is preferably placed in a conventional steam-sterilizer 200 (door not shown), and heated conventionally. For example, the steam chamber of U.S. Pat. No. 5,488,815 can be used, wherein the temperature is increased to 121° C. for sterilization, typically for a time of about 15 minutes. Because of the invention, the label does not transfer to either other containers or the package.

The stacks are shown as being vertical; alternatively they can be oriented horizontally.

Figure 4:
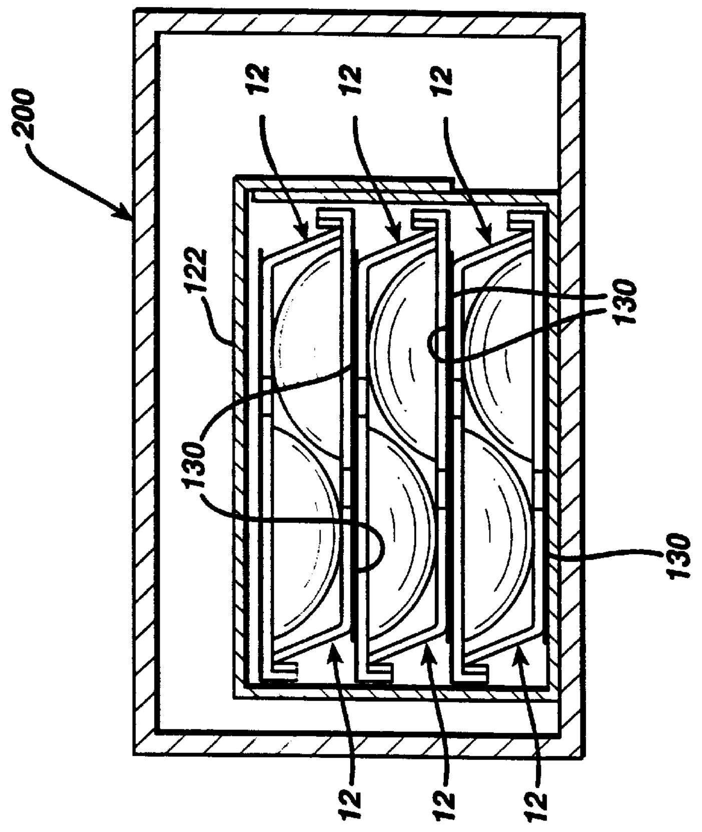
FIG. 4 is an elevational view in section of a steam sterilizer, illustrating the sterilizing aspect of the invention.

Alternatively, package 122 can be omitted, and containers 112 can be stacked as shown in FIG. 4, but on a moveable pallet (not shown) that is conveyed through chamber 200. Following such sterilization, containers 112 are then boxed up in a conventional manner into a package such as package 200.

The advantage, then, is that contact lens containers 112, which inherently have their label images on the surface of largest area, can use the largest surface area for stacking during sterilization—a step not possible for thermally-printed labels.

The invention disclosed herein may be practiced in the absence of any element which is not specifically disclosed herein.

The invention has been described in detail with particular reference to preferred embodiments thereof, but it will be understood that variations and modifications can be effected within the spirit and scope of the invention.

What is claimed is:

1. A method of preventing transfer of printed labels on stacked containers during steam-sterilization, comprising the steps of:

a) providing a label on an exposed surface of the container, the label comprising a first layer comprising a metal or a polymer, said first layer having a predetermined apparent color; a second layer affixed to said metal layer and comprising a polymer, said second layer having two opposing surfaces, one of said surfaces being a proximal surface affixed to said first layer and the other of said surfaces being a distal surface spaced away from said first layer when affixed, one or both of said surfaces bearing a coating of ink or dye, an area of any ink or dye on said distal surface being selected from a color that is in contrast to said predetermined color and an area of any ink or dye on said proximal surface being of a color that is in contrast to said ink or dye on said distal surface or to said predetermined color of said first layer; a portion of said second layer being ablated away at said area of ink or dye by a laser in accordance with a label pattern in an amount sufficient to expose, in the ablated portions, either ink or dye on said proximal surface, or said first layer;

b) stacking at least some of the containers so that the label of at least one of the stacked containers contacts the surface of an adjacent container; and c) while maintaining the stack, subjecting the stack to steam at a temperature, pressure and exposure time sufficient to sterilize the stacked containers and their contents;

so that said label in contact with said next adjacent container does not transfer in whole or in part and remains legible.

2. A method as defined in claim 1, wherein step d) comprises the steps of i) placing the stack of containers within a package, and ii) steam-sterilizing the package as well as the stacked containers inside the package.

3. A method as defined in claim 1, wherein said first layer is a metal and said second layer is a transparent or translucent polyester.

4. A method of forming a label for a cover of a container of contact lenses, comprising the steps of:

a) providing as a surface portion of said cover, a first layer comprising a metal or a polymer, said first layer having a predetermined apparent color;

b) affixing to said layer, a second layer comprising a polymer, said second layer having two opposing surfaces, one of said surfaces being a proximal surface affixed to said first layer and the other of said surfaces being a distal surface spaced away from said first layer when affixed, one or both of said surfaces bearing a coating of ink or dye, an area of any ink or dye on said distal surface being selected from a color that is in contrast to said predetermined color and an area of any ink or dye on said proximal surface being of a color that is in contrast to said ink or dye on said distal surface or to said predetermined color of said first layer; and c) ablating away in said area of any ink or dye a portion of said second layer with a laser in accordance with a label pattern, in an amount sufficient to expose, in the ablated portions, either ink or dye on said proximal surface, or said first layer.

5. A method as defined in claim 4, wherein said first layer is a metal and said second layer is a transparent or translucent polyester.

6. A method as defined in claim 5, wherein only one of said distal and proximal surfaces has said area of ink thereon, of a color that is in contrast to said predetermined color of said first layer, and said ablating step removes material down to said first layer to expose the same.

7. A method as defined in claim 6, wherein said ink is on said distal surface.

8. A method as defined in claim 6, wherein said ink is on said proximal surface.

9. A method as defined in claim 1 or 4, wherein said ink is on both of said opposing surfaces and wherein said ablating step removes only enough material to expose said area of ink on said proximal surface.

10. A method as defined in claim 1 or 4, wherein said second layer polymer is selected from the group consisting of a polyamide, a polyester, a polyolefin, a polystyrene, and a polycarbonate.

11. A label of a cover for a container of contact lenses, produced by the process of:

a) providing as a surface portion of said cover, a first layer comprising a metal or a polymer, said first layer having a predetermined apparent color;

b) affixing to said layer, a second layer comprising a polymer, said second layer having two opposing surfaces, one of said surfaces being a proximal surface affixed to said first layer and the other of said surfaces being a distal surface spaced away from said first layer when affixed, one or both of said surfaces bearing a coating of ink or dye, an area of any ink or dye on said distal surface being selected from a color that is in contrast to said predetermined color and an area of any ink or dye on said proximal surface being of a color that is in contrast to said ink or dye on said distal surface or to said predetermined color of said first layer; and c) ablating away in said area of any ink or dye, a portion of said second layer with a laser in accordance with a label pattern, in an amount sufficient to expose, in the ablated portions, either ink or dye on aid proximal surface, or said first layer.

12. A label as defined in claim 11, wherein said second layer polymer is selected from the group consisting of a polyamide, a polyester, a polyolefin, a polystyrene, and a polycarbonate.

* * * * *